Sept. 29, 1959　　　E. UMBRICHT ET AL　　　2,906,511
GAS WASHING APPARATUS

Filed May 1, 1956　　　　　　　　　　　　　2 Sheets-Sheet 1

INVENTOR
EMIL UMBRICHT
DEWEY EVANS
GERRIT STEENHAGEN
BY Curtis, Morris & Safford
ATTORNEYS

United States Patent Office

2,906,511
Patented Sept. 29, 1959

2,906,511

GAS WASHING APPARATUS

Emil Umbricht, Jackson, Dewey Evans, Plymouth, and Gerrit Steenhagen, Walled Lake, Mich., assignors to Ajem Laboratories, Inc., Livonia, Mich.

Application May 1, 1956, Serial No. 582,000

12 Claims. (Cl. 261—24)

The present invention relates to gas washing apparatus and more particularly to air washing apparatus of the type used for removing particles, such as dust or paint spray from the air.

The air washing apparatus described herein as an illustrative embodiment of the invention is well adapted for use in connection with paint spray booths for efficiently removing the over-spray material from the air which is being exhausted from the spray booth. This prevents the paint particles from being discharged into the atmosphere, and in some instances enables the recovery of the overspray material for reprocessing reuse. In this apparatus the air being washed is advantageously brought into intimate contact with sheets of moving liquid, is passed through two curtains of the washing liquid. This invention is in the nature of an improvement on the gas washing apparatus disclosed in the copending application filed in the name of Emil Umbricht on September 24, 1954, under Serial No. 458,336, and in the copending application filed jointly by Emil Umbricht, Gerrit Steenhagen, and Willard L. Johnson on June 16, 1955, under Serial No. 515,997.

The apparatus described in these prior applications are highly satisfactory and effective in many installations. The improved apparatus described herein has a number of advantages which make it particularly well suited for heavy duty operation, for example, for use with paint spray booths where the volume of the overspray material is great and substantially complete removal of this overspray from large volumes of air is required. This improved apparatus provides a high efficiency in removing paint particles from the air and obtains its efficient operation with only a relatively small amount of maintenance and cleaning being required during operation over long periods of time.

In some types of air washers now in use, a dense, high velocity liquid spray is produced by mechanically moving members such as rotating cages or propeller blades. The air to be washed is then forced at relatively high velocity through the liquid spray. In such air washers some of the moving parts are exposed to the spray, thus making it necessary to provide special arrangements to protect the bearings of the apparatus from the liquid, and in some instances, subjecting the moving parts to excessive abrasion. Moreover, although such washers are highly effective, substantial motive power is required to form the high velocity spray.

In other types of air washers, the liquid spray is produced by a series of nozzles to which the liquid is supplied under high pressure. With systems of this latter type it is difficult to obtain a spray of sufficient depth and uniformity to provide adequate cleaning action for many industrial operations. Thus, for example, in air washers of this type as well as in other types, there is some tendency for the air stream to form into channels and follow open spaces through the spray so that little washing action takes place in these regions.

Still other types of washers have a series of baffles which form a curtain of water as the water runs off the end of one baffle and falls onto the surface of a lower baffle. A counter-current of air to be washed is passed through the baffle structure so that a certain amount of washing takes place as the curtains of water are broken into a spray by the action of the counter current of air. Washing apparatus of this counter-flow baffle type has a number of advantages in that moving parts are eliminated from the washing regions and the cost of construction is low. Such washing arrangements previously used have several shortcomings, however, and have thus far achieved only limited acceptance in industrial operations. For example, they tend to clog in handling materials that are tacky or sticky, or which become so when wetted with water. The materials washed from the air collect on the surfaces of the baffles and they are difficult to clean.

Thus, it is important that all of the surfaces be wet continuously with a film of water and that there be no abrupt discontinuities in the surfaces which would provide a focal point for the collection of solid material.

In accordance with the illustrative embodiment of the invention described herein for use with a paint spray booth the over-spray material, that is, the paint material which misses the articles being coated is arranged to impinge on a pair of curtains of the air washing liquid running down over the front faces of a pair of floodsheets. The air from the booth is sucked into an air intake opening between these floodsheets and then passes through a serpentine passage between continuous undulating surfaces which are wet continuously with films of the washing liquid. Some of the paint particles, particularly the larger ones, are removed by the curtains over the floodsheets, the remaining paint particles are removed by the highly advantageous cleansing action obtained in the serpentine path behind the air intake.

The washing liquid used is water having in the solution various chemical agents which facilitate handling the overspray material. Suitable agents include material for "killing" the sticky qualities of the paint and causing it to float, also foam inhibitors, rust inhibitors, and detergents. For example, suitable paint handling agents for addition to water are disclosed in an application of Orlan M. Arnold filed October 21, 1952, under Serial No. 316,049, issued as Patent No. 2,739,903, on March 27, 1956, and in an application of Arnold et al. filed October 21, 1953, under Serial No. 655,695.

Among the many advantages of the improved apparatus described herein are those resulting from the fact that a pair of flood sheets are provided, with an enlarged air intake opening between the floodsheets. The air intake is positioned substantially higher than in previous apparatus with one of the floodsheets extending down from the intake to the floor level. Thus, advantageously the height of the liquid curtains flowing down over the front faces of the flood sheets are reduced. A more uniform distribution of the liquid curtains results, and the concentration of paint particles in these curtains is reduced. In addition, the flood sheets are inclined outwardly at the bottom a slight degree from vertical. This causes the water curtains to cling more closely to the floodsheets. An improved cleansing action occurs so that any paint particles which penetrate the curtains and tend to stick to the floodsheets are quickly washed off.

In the industries using paint spray equipment the extent of maintenance and cleaning required for apparatus used to handle the overspray material is of serious commercial importance. For the most part such air washers form links in a mass production line. Any time required for cleaning or other maintenance interrupts production schedules and usually must be done at night time or over weekends which causes great expense and inconvenience. Among the many advantages of the apparatus described herein is its reduced requirement for maintenance and cleaning, for example, the pair of front floodsheets are self-cleaning, as mentioned above.

Another advantage of the improved apparatus described is its improved ventilation and greater capacity for handling air. The air intake opening is streamlined and positioned between the floodsheets, being coated both front and back by continuous films of water. A large percentage of the paint particles which are not trapped in the two front curtains are hurled down through a front sepentine passage onto the top of a layer of liquid which is flowing in the direction of the air stream.

Then the air passes through two separate and freely falling curtains. Thus, a large percentage of the foreign material is removed from the air. The air stream then abruptly reverses direction travelling upwardly through a second or rear serpentine path into a plenum chamber where the last few traces of any of the washing liquid is removed. Because of the highly effective washing action of the front serpentine path the air stream passing up through the rear serpentine path is substantially free of foreign material. This rear serpentine path produces a final washing action which further boosts the efficiency of the apparatus so that substantially pure air is discharged.

A more regular and uniform inflow of the air from the booth into the streamlined air intake is assured by the present apparatus. This provides a very desirable higher average air velocity throughout the full volume of the paint spray booth. Thus, advantageously, the operator is enabled to work without any annoying clouds or mists of over-spray swirling in the booth about his head and interfering with his field of vision.

Among the further advantages of the illustrative apparatus described herein are its reduced headroom requirement which is obtained by virtue of its increased efficiency. In addition, the shape of the lip which is formed at the upper edges of the front floodsheets has proven advantageous in providing a more uniform distribution of the washing liquid over the floodsheets and in inhibiting any sticking of paint particles at the lip. Advantageously, the lower edge of the lower flood sheet curves outwardly to drop the associated curtain of water into the reservoir of washing liquid at the bottom without any undue splashing.

In this specification and in the accompanying drawing is described and shown a highly advantageous embodiment of our invention and various modifications thereof are indicated, but it is to be understood that this is not intended to be exhaustive or limiting of the invention, but on the contrary is given for purposes of illustration in order that others skilled in the art may fully understand the highly effective gas washing operation provided by this invention and the manner of applying the invention in practical use so that they may modify and adapt it in various forms, each as may be best suited to the conditions of a particular use.

The various objects, aspects, and advantages of the present invention will be more fully understood from a consideration of the following specification in conjunction with the accompanying drawings, in which.

Figure 1:
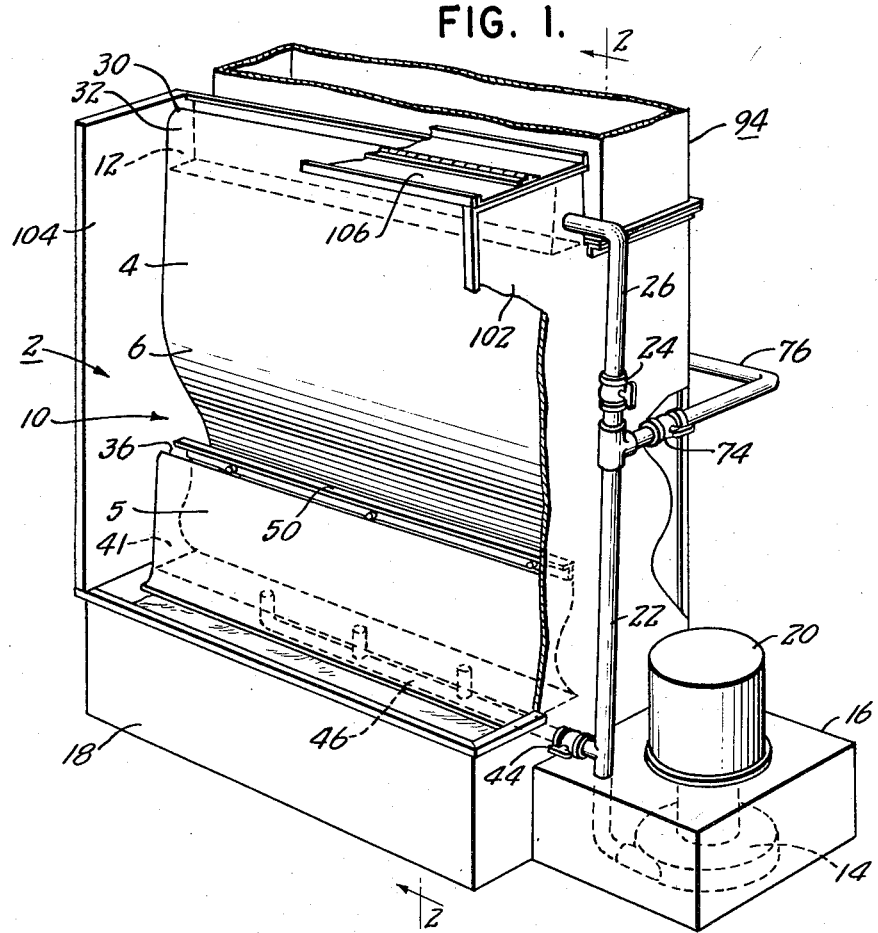
Figure 1 is a perspective view, partly in dotted line and partially broken away of an air washer adapted for spray booth operation and embodying the present invention.

As shown in the drawings, the improved air washing apparatus of the present invention has certain features similar to those of the apparatus described in the prior co-pending applications identified above. Some of these features of the prior apparatus are described herein for the purpose of explaining how the improvements embodied in this apparatus cooperate therewith, thus giving a more complete understanding of the advantageous operating characteristics and of the improvements embodied in this present apparatus.

The spray booth comprises an area, generally indicated at 2, where the articles are sprayed with paint. The rear wall of this booth is formed by a pair of panels, called upper and lower floodsheets 4 and 5, respectively. The upper flood sheet 4 extends substantially from the top of the spray booth down around a sweeping curve 6 and continues on downwardly, forming the rear wall 7 of a front serpentine air passageway 8. The sweeping curved surface 6 blends smoothly into the rear wall 7 and defines the streamlined top portion of an air intake opening 10, below which extends the lower flood sheet 5.

In order to provide a smooth curtain of liquid flowing down over the upper flood sheet 4, a trough 12 at the top of the flood sheet is continuously supplied with washing liquid from a non-clogging type centrifugal pump 14, shown dotted in Figure 1. This pump is located in a side extension 16 of the bottom tank or reservoir 18 and is driven by an electric motor 20. A pump of the type disclosed by Emil Umbricht in his application Serial No. 357,450, filed May 26, 1953, can be used to advantage for this purpose. The washing liquid is pumped up a feeder 22 and through a control valve 24 and through a pipe 26 which feeds into the trough 12.

In order to provide a smooth uniform flow of liquid down over the front face of the flood sheet 4, so as to form a curtain 28 suitable for trapping paint particles which strike it, the front edge of the trough 12 is formed with a lip 30. This lip is rounded back from the flood sheet and has a forwardly inclined rear surface below which is an under cut region. We have found that this particular lip shape is advantageous in preventing any accumulation of paint particles along or behind the lip. This feature of inhibiting any collection of paint near the lip is very desirable in reducing cleaning requirements.

With some prior apparatus there is a tendency for paint particles to begin collecting near the top of a floodsheet. These accumulations act like small dams which part the curtain and form bare areas of inverted V shape. Once the floodsheet has become bare, the over-spray impinges directly upon it, causing rapid build up of material which must be laboriously cleaned off. Once this build up begins, it rapidly becomes worse, for each additional bit of overspray which sticks to the floodsheet causes further disturbances and interruptions in the liquid curtain which expose more of the flood sheet.

As shown herein the trough 12 has a large capacity, for example, with the illustrative apparatus which is capable of handling more than 8,000 cubic feet of air per minute, the trough is about 4 inches wide, about 10 inches high and 8 feet long and is supplied from the pipe 26 with about 300 gallons of liquid per minute. The front wall 32 of the trough is vertical and overlaps the top of the floodsheet 4 and effectively forms an upper extension of it. Above the sweeping curve 6 the floodsheet 4 is planar and slopes outwardly toward the bottom at an angle of about 2°. This slight pitch of 2° of the floodsheet from the vertical can be varied for different spray booth applications. Where the thickness of the film of liquid in the curtain is slight, the pitch of the floodsheet 4 can be reduced to about 1°. But where large air volumes are being handled and the liquid supply capacity to the trough 12 is large, providing a thick curtain 28, then it is usually desirable to use an angle of at least 2° from the vertical.

We have found it desirable to maintain the height of the upper planar portion of the floodsheet 4 relatively low. This has the advantage of providing a more uniform thickness in the curtain 28 as it slides down. In this illustrative embodiment of the invention the planar portion of the floodsheet is 30 inches high.

As a result of the advantageous arrangement of the trough and floodsheet, a relatively thick uniform curtain of water flows down over the floodsheet 4. It clings closely to the surface of this floodsheet and is highly effective in catching and trapping all of the overspray particles which impinge against it.

The liquid curtain 28 flows around the sweeping curve 6 and continues on down a concave portion 31 of the rear wall 7 of the front serpentine passage 8. The bend of the curve 6 is gradual so that substantially all of the liquid in the curtain 28 remains in contact with it. In this embodiment of the invention the radius $R_1$ of curvature of the curved portion 6 is about 28 inches and is centered at a point 33 which is at the same height as the lower limit of the planar portion of the floodsheet 4 making this curve tangent thereto. In addition, the influx of the air into the opening 10 as indicated by the arrows 34 helps to hold this liquid against the curve 6. Many of the overspray particles which did not initially strike the curtain 28 are flung against the film of liquid covering the curve 6 and onto the liquid film covering the concave portion 31 and the lower convex curve at the bottom of the rear wall 7.

The concave portion 31 as illustrated has a radius $R_2$ of about 12 inches centered just inside of the crown of the lower lip 36, which forms the top of the lower floodsheet 5. The incoming airstream 34 sweeps around inside this curve 31, flinging the overspray particles against the film of liquid covering it.

A front curtain 36 of freely falling liquid slides off of the lower edge of the wall 7 and drops across the lower end of the serpentine passage 8 screening out and trapping a large portion of any remaining foreign particles in the airstream.

In order to create a liquid curtain 40 over the front face of the floodsheet 5, a large capacity trough 41 is provided between the floodsheet 5 and the front wall 42 of the serpentine passage 8. In this apparatus the trough 41 is about 21 inches deep and has an average width of about 10 inches and is also 8 feet long. Washing liquid is supplied from the feeder 22 through a control valve 44 and a pipe 46 connected through three spaced inlets, shown dotted in Figure 1, to the bottom of the trough 41, as seen most clearly in Figure 2.

The floodsheet 5 is planar and has a slight deviation from the vertical, corresponding to that of the upper floodsheet. In this apparatus these two floodsheets are in a common plane. At its lower edge the floodsheet 5 is curved forwardly at 48 almost horizontally so as to smoothly decelerate the liquid curtain 40 before it drops into the reservoir 18. This is helpful in preventing splashing of the overspray laden liquid as it drops back into the reservoir 18. This lower floodsheet, as shown, has a relatively small height, for example, about 2 feet, which works to advantage in providing a heavy uniform curtain 40.

It will be noted from the above dimensions that the air intake opening 10 is a substantial distance above the lower limits 48 of the lower floodsheet 5. Moreover, the effective mouth of this opening is desirably large and directed for maximum effectiveness in drawing in the air. In this embodiment the mouth of the opening 10 as measured from the point of tangency between the sweeping curve 6 and the planar portion of the floodsheet 4 down to the crown of the lip 36 is the same height as that of the panel 4, being about 30 inches.

This air intake opening is shown positioned about one-third of the distance up the front face of the apparatus, that is, up the face formed by the floodsheets 4 and 5 and by the sweeping curve 6. For different applications, for example, where greater volumes of the overspray material are concentrated nearer the top of the front face of the apparatus, then the relative location of the air intake may be raised. Generally we find it to be advantageous to have this opening at a position spaced between one-third and two-thirds of the distance up the front face of the apparatus. Having this opening at the one-third level has proven most desirable for a wide variety of paint spray booth uses.

In order to control the rate of flow of liquid down into the serpentine path 8 and down along the surface 42, a weir 50 is adjustably secured to the top edge of the surface 42. As shown this weir 50 is generally L-shaped in cross section, with one of its legs curved transversely to fit snugly with the top of the surface 42. Bolts fitting through vertical slots in this leg enable its height to be adjusted. The other leg of the weir 50 is directed inwardly horizontally over the surface of the liquid in the trough 41 and is positioned about ¼ of an inch above the crown of the lip 36 so that more liquid flows down in the curtain 40 than in the film over the surface 42. The lip 36 is rounded back at the front toward the crown. It has a rear surface which slopes downwardly away from the crown and is then bent under to provide a sloping surface which in effect undercuts the crown and engages the front wall of the trough.

As the airstream 34 sweeps along the surface 31 and bends sharply over the weir 50, it is mixed with washing liquid passing over this weir. Some of this liquid flows over the weir and clings to the surface 42 forming a film to trap foreign particles in the airstream. The airstream also blows some of the washing liquid over the weir 50. In effect, this blown liquid is skimmed off from the body of liquid in the trough and is carried over the weir 50 and then abruptly downwardly into a highly turbulent region 52 where it forms a dense whirling mass of air, washing liquid and foreign particles. This region 52 extends substantially completely across the serpentine path 8 between the surfaces 7 and 42 and also extends horizontally the full length of this path.

In order to produce an intimate intermixing of the washing liquid and air, the covex curvature of the top portion of the wall 42 is concentric with the concave portion 31 of the opposite wall and has a radius $R_3$ which is about 7 inches. Below this the path 8 has a reverse curve defined by concentric portions of the walls 42 and 7 centered at a point and of radii 11 and 6 inches, respectively. Thus, the serpentine path 8 is of uniform cross section throughout its length and is defined by smooth continuous walls.

After leaving the serpentine passage 8 and passing through the curtain 38 the airstream strikes down upon a liquid film passing along a bottom panel 57 which is inclined slightly downwardly away from the path 8. This film 56 spills down a passage 58 into the reservoir.

A decelerating path 59 is positioned behind the free curtain 38 over the film 56 and ahead of a second curtain 60 of freely falling liquid. Thus, the airstream slows down before passing through the curtain 60. Further effective cleansing of the airstream occurs as any foreign particles are trapped in the film 56 and swept down by the free curtains 38 and 60.

Thereafter the airstream slows down further in a zone 62 behind the curtain 60 enabling some of the remaining overspray material to drop out into the film 56 or strike a liquid film covering a vertical rear panel 64 and covering an upwardly sloping panel 66 defining the mouth of a rear serpentine passage 68. In passing up into this serpentine path the stream of gas sharply reverses direction and accelerates upwardly along the panel 66.

Figure 3:
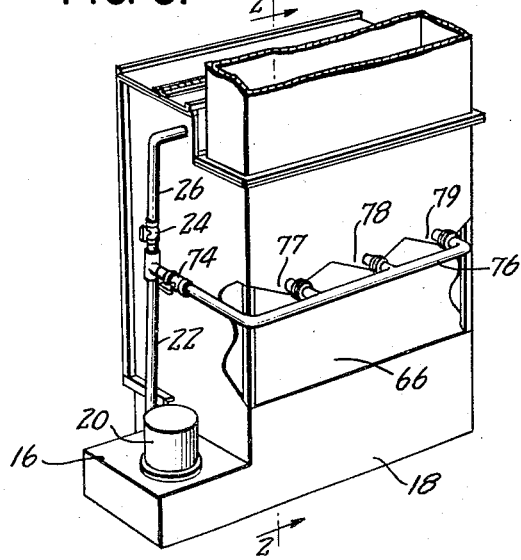
Figure 3 is a perspective view on reduced scale as seen from a rear corner.

In order to supply a film of washing liquid over the surface of the panels 64 and 66 and down along the continuous smoothly undulating rear wall 70 of the passage 68, a liquid supply trough 72 extends the full width of the apparatus. Liquid is fed through a control valve 74 and by a pipe 76 to three spaced couplings (Figure 3) which connect into three broad V-shaped troughs 77, 78, and 79 (Figure 3) which open up into the main trough 72. Baffles 81 are placed in each of the V-shaped troughs 77 directly opposite the mouths of the respective liquid inlet couplings. These baffles receive the rapid influx of the washing liquid and slow it down, so that the liquid spreads uniformly along the length of the main trough 72.

From trough 72 the liquid spills down an incline 80 and flows uniformly onto the wall 70. This liquid is in excess of the quantity required to wet completely the inner surfaces of the wall 70 and panels 66 and 64. As the film of liquid continues along the inner surface of the sinuous wall 70 the excess over the amount which will cling to the inner wall falls across the serpentine path 68 and impinges upon the opposite walls 82.

Figure 2:
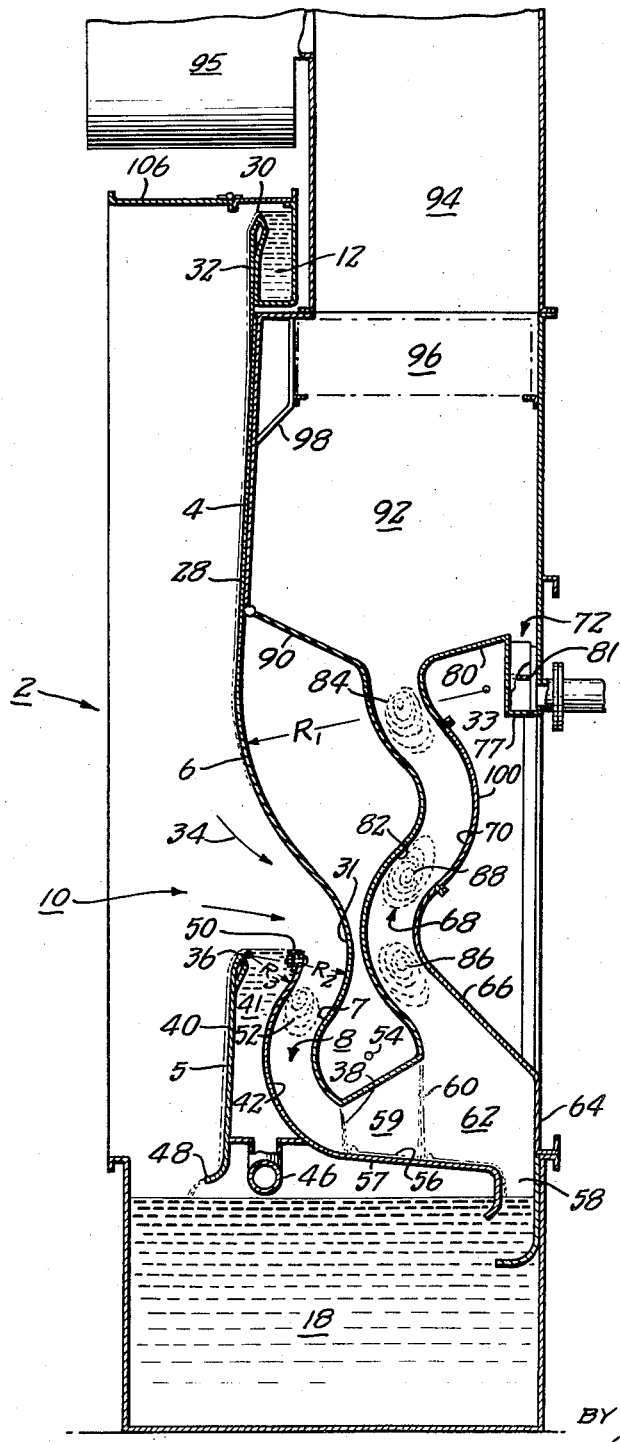
Figure 2 is a vertical sectional view on enlarged scale of the apparatus taken generally along line 2—2 of Figure 1.

This liquid, which would fall as a substantially continuous curtain of water down across the path 68 if it were not for the draft of air moving upwardly through the space between the walls 70 and 82 is broken up by the action of the air stream, as indicated diagrammatically at 84 and 86 in Figure 2.

Then the action of the upwardly moving gas plus the liquid which does not remain on the wall 70 creates a highly turbulent condition in the regions 84 and 86 tending to form dense whirling masses of liquid, air and whatever very, very slight amount of foreign matter that happens to remain in the gas. These regions 84 and 86 extend substantially completely across the space between the walls 70 and 82 and also extend horizontally the full length of these walls so that all of the gas passing upwardly between the walls 70 and 82 must pass through these further cleaning regions.

The liquid which forms the swirl 84 is collected on the inner surface of the wall 82 and flows downwardly along the surface of this wall until it reaches the bend near the region indicated at 88 in Figure 2, whereupon a portion of the liquid continues to follow the inner surface of the wall 82 and maintains a moving film over its entire surface, and the excess liquid leaves the surface and falls downwardly back toward the inner surface of wall 70. Here also the gas stream breaks the liquid into a dense spray through which the gas stream is forced to pass. The liquid from this spray then falls downwardly upon the inner surface of the wall 70 and continues its downward movement to form the lowest turbulent air washing region in the path 68, as indicated at 86.

The serpentine path 68 has a uniform width of 6 inches and is defined by the sinuous walls 70 and 82 which have convex bends of 6 inch radius and concentric concave bends of 12 inch radius. Because of its larger cross section, the velocity of the gas passing upwardly in the serpentine path is about 20% less than the downward velocity of the air in the front serpentine path 8. This differential in velocity is of benefit in assuring increased efficiency in cleaning the gas.

When the gas reaches the top of the path 68, the velocity of the gas is rapidly decrease by the sudden further increase in area in the plenum chamber 92. The heavier liquid droplets are thus enabled to fall back toward the inclined panels 80 and 90 leading down to the sinuous walls 70 and 82, respectively.

As the velocity of the gas is decreased, the combining of the remaining smaller droplets of liquid particles and their subsequent precipitation is enhanced. This precipitated liquid supplements that from the trough 72 in maintaining the films on the walls 70 and 84.

In order to prevent any of the smaller droplets or particles which remain borne by the ascending gas in the plenum chamber from being carried out, an exhaust duct 94 leading to a blower 95 partially shown in Figure 2, a plurality of baffles are arranged to form the moisture eliminator 96 which is located between the plenum chamber 92 and the exhaust duct 94. In this example the baffles are formed by a series of spaced metal sheets having V-shaped corrugations arranged so that the gas passing through the eliminator 96 is forced to follow a zigzag path before entering the exhaust duct. The sudden changes in direction of the gas in the moisture eliminator 96 cause any remaining droplets or particles to be deposited on the metal sheets. This liquid then drains from the eliminator along an inclined sheet 98 and then down to the sloping panel 90.

The apparatus disclosed herein is so effective that in many instances the exhausted air after passing the blower 95 is recirculated in the plant. In some instances it is discharged out of doors.

To give access to the passage 68, the rear of the apparatus can be opened, as indicated and a door 100 forming a concave bend in the wall 70 removed.

The liquid carries the foreign material down into the reservoir 18. In association with the reservoir 18 and its extension 16 is suitable sludge removing equipment, not shown. For example, the reservoir 18 may be divided by a vertical partition into a front portion and a rear portion, as shown in the above-identified application Serial No. 458,336.

The liquid is circulated from the front tank portion through a suitable port in the partition and then into the rear tank portion where suitable filter means are used to filter and remove the overspray material from the liquid prior to its recirculation by the pump 14. This cleaning and recirculation cycle of the liquid is described in detail and claimed in this above-identified copending application.

Side panels 102 and 104 and a ceiling panel 106 are included in the apparatus, extending forwardly and adapted with flanges for connection to other forwardly extending panels (not shown) so as to form a deeper spray booth, where desired. In Figure 1 the trough 41 is shown empty to illustrate the weir bolts and slots which enable its vertical adjustment.

It will be noted that all surfaces within the serpentine pathways 8 and 68 are continuous, and form smooth curved surfaces, which are continuously wet with moving films of liquid. Discontinuities are avoided and films of washing liquid are maintained over these surfaces, preventing the collection of foreign material especially those which are inherently sticky or become sticky when wet. In addition, the smooth undulations shown avoid undesired backward eddy currents against the surfaces 7, 42, 70, and 82 which would produce a tendency for the collection of contaminating materials and which increase the resistance to gas flow without providing a corresponding increase in washing action.

Although in the accompanying drawings we have shown a preferred embodiment of our invention and have described the same and various modifications thereof in this specification, it is to be understood that these are not intended to be exhaustive but, on the contrary, are chosen for the purpose of illustrating the invention in order that others skilled in the art may so fully understand the invention, its principles and the application thereof that they may embody it and adapt it in numerous forms, each as may be best suited to the requirements of its particular use, without departing from the scope of the following claims.

We claim:

1. Air washing apparatus for use with paint spray booths and the like comprising a first substantially planar floodsheet extending substantially vertically, first liquid supply means supplying a curtain of washing liquid to the top of the front face of said first floodsheet, the front face of said floodsheet being inclined forwardly from the vertical toward the bottom by an angle in the range from 1° to 2°, a second substantially planar floodsheet extending substantially vertically and being positioned below said first floodsheet, the front face of said second floodsheet being inclined forwardly from the vertical toward the bottom by an angle in the range from 1° to 2°, second liquid supply means supplying a curtain of washing liquid to the top of the front face of said second floodsheet, said floodsheets being spaced apart vertically and defining therebetween an air intake opening, first and second curved walls, means supporting said curved walls in generally upright spaced relationship defining a serpentine path therebetween, the inner surfaces of said walls being smooth and continuous and free from abrupt discontinuities, said inner surfaces having films of the washing liquid thereon, said air intake opening communicating with said serpentine path, and means for forcing the air in through said intake opening and through said serpentine path.

2. Air washing apparatus for use with paint spray booths and the like comprising a first substantially planar floodsheet extending substantially vertically, first liquid supply means supplying a curtain of washing liquid to the top of the front face of said first floodsheet, the front face of said floodsheet being inclined forwardly from the vertical a slight amount toward the bottom, a second substantially planar floodsheet extending substantially vertically and being positioned below said first floodsheet, the front face of said second floodsheet being inclined forwardly from the vertical a slight amount toward the bottom, second liquid supply means supplying a curtain of washing liquid to the top of the front face of said second floodsheet, said floodsheets being spaced apart vertically and defining therebetween an air intake opening, first and second curved walls, means supporting said curved walls in generally upright spaced relationship defining a serpentine path therebetween, the inner surfaces of said walls being smooth and continuous and free from abrupt discontinuities, said inner surfaces having films of the washing liquid thereon, said air intake opening communicating with said serpentine path, and means for forcing the air in through said intake opening and through said serpentine path, and means defining a reservoir of washing liquid in the bottom of said apparatus, the lower edge of said second floodsheet being curved forward to a substantially horizontal position and this edge being spaced a relatively small distance above the surface of the liquid in said reservoir.

3. Air washing apparatus for use with paint spray booths and the like comprising a first floodsheet having a planar portion extending substantially vertically, first liquid supply means supplying a first curtain of washing liquid to the top of the front face of said first floodsheet, a second floodsheet extending substantially vertically and being positioned below said first floodsheet, second liquid supply means supplying a second curtain of washing liquid to the top of the front face of said second floodsheet, said floodsheets being spaced apart vertically and defining therebetween an air intake opening, said first floodsheet including a convexly curved portion which sweeps downwardly and rearwardly from said planar portion with such gradual curvature as to hold a substantial amount of the first liquid curtain in contact therewith, said convexly curved portion defining the upper surface of said air intake opening, said first floodsheet having a lower part including a concavely curved portion below and smoothly contiguous with said convexly curved portion, said concavely curved portion having such gradual curvature as to hold a substantial amount of the first liquid curtain in contact therewith and defining the rear surface of said intake opening, the lower part of said first floodsheet including a second convexly curved portion below and smoothly contiguous with said concavely curved portion having such gradual curvature as to hold a substantial amount of the first liquid curtain in contact therewith, a first sinuous wall spaced from the lower part of the first floodsheet and defining a downwardly extending serpentine passage therebetween, said serpentine passage communicating at its upper end with said intake opening, said sinuous wall having a convex portion opposite the concavely curved portion of the first floodsheet and a concave portion opposite the second convexly curved portion of the first floodsheet, liquid supply means supplying a third curtain of washing liquid flowing down said first sinuous wall, means defining a transverse passageway communicating with the lower end of said serpentine passage, second and third spaced, upwardly extending sinuous walls having a plurality of opposed contiguous concave and convex portions defining a second upwardly extending serpentine passage communicating at the bottom with said transverse passageway, said second serpentine passage extending upwardly behind the first floodsheet to a position above the level of said intake opening, and liquid supply means feeding liquid into the top of said second serpentine passage.

4. Air washing apparatus as claimed in claim 3 and wherein said first liquid curtain falls freely from the lower part of said first floodsheet forming a liquid curtain falling freely across said transverse passageway, liquid flowing from the lower end of said second serpentine passage forming another liquid curtain falling freely across said transverse passageway, the cross sectional area of said transverse passageway being larger at the position of one of said freely falling curtains than at the other, whereby to provide a difference in air velocity in passing through said two freely falling curtains.

5. Air washing apparatus for use with paint spray booths and the like comprising a first floodsheet having a planar portion extending substantially vertically, first liquid supply means supplying washing liquid to the top of the front face of said first floodsheet to form a first liquid curtain flowing downwardly thereover, a second floodsheet extending substantially vertically and having a horizontal top lip positioned below said first floodsheet, means defining a trough behind said lip, second liquid supply means feeding said trough and flowing said liquid from said trough over said lip and down said second floodsheet to form a second liquid curtain thereover, said floodsheets being spaced apart vertically and having therebetween an air intake opening, said first floodsheet including a convexly curved portion which sweeps downwardly tangentially from said planar portion and curves inwardly with such gradual curvature as to hold a substantial amount of the first liquid curtain in contact therewith, said convexly curved portion defining the upper surface of said intake opening, first and second curved walls, means supporting said curved walls in generally upright spaced relationship defining a generally vertical serpentine path therebetween, communicating with said intake opening and extending therebelow, the inner surfaces of said walls being smooth and continuous and free from abrupt discontinuities, said first wall having its top edge spaced inwardly from said lip at about the same height as said lip and forming a boundary for said trough with the liquid in said trough spilling down over the inner surface of said first wall and forming a film thereon, said second wall connecting smoothly with said convex portion and having the liquid from said first curtain forming a film thereon, and means forcing the air in through said intake opening and down said serpentine path.

6. Gas washing apparatus for producing intimate contact between a liquid and a gas comprising first and second pairs of spaced curved walls, means supporting said walls in each pair in generally upright spaced relationship defining a first serpentine path between said first pair of walls and defining a second serpentine path between said second pair of walls, the inner surfaces of all of said walls being smooth and continuous and free from abrupt discontinuities, means for supplying said liquid to upper portions of all of said walls, means defining a transverse pathway, the lower portion of said first serpentine path communicating through said transverse path with the lower portion of said second serpentine path, the lower edges of adjacent walls in each of said pairs terminating with abrupt discontinuities enabling the films of liquid to drop therefrom forming a pair of free liquid curtains across said transverse path, and means forcing the gas down through said first sepentine path, through said tansverse path past two free liquid curtains and up said second serpentine path.

7. Gas washing apparatus for producing intimate contact between a liquid and a gas comprising first and second pairs of spaced curved walls, means supporting said walls in each pair in generally upright spaced relationship defining a first serpentine path between said first pair of walls and defining a second serpentine path between said second pair of walls, the inner surfaces of all of said walls being smooth and continuous and free from abrupt discontinuities, means for supplying said liquid to upper portions of all of said walls, first surface means interconnecting the lower portions of the adjacent walls in each pair, second surface means in interconnecting the lower portions of the remote walls in each pair, said first and second surfaces defining a passage interconnecting the lower portions of said two serpentine paths, said first and second surfaces diverging in a direction from said first to said second serpentine path, the intersections of said adjacent walls with said first surface means forming abrupt discontinuities releasing a pair of free curtains of said liquid falling across said passage, and means forcing the gas down through said first serpentine path, through said two free curtains and up said second serpentine path.

8. Gas washing apparatus as claimed in claim 7 and wherein the adjacent wall of said second serpentine path terminates at a higher position than the adjacent wall of said first serpentine path, and wherein said first surface means slope upwardly at a substantial angle in passing from said first to said second serpentine path.

9. Gas washing apparatus as claimed in claim 7 and wherein said second surface means form a continuation of the lower portion of the remote wall of said first pair and slope downwardly in the direction from said first to said second serpentine path, and said free curtains of liquid fall toward said continuation.

10. Gas washing apparatus for producing intimate contact between a liquid and a gas comprising first, second, third, and fourth spaced vertically undulating walls, means supporting said first and second walls in generally upright uniformly spaced relationship defining a first upright serpentine path therebetween, means supporting said third and fourth walls in generally upright uniformly spaced relationship defining a second upright serpentine path therebetween, the inner surfaces of all of said walls being smooth and continuous and free from abrupt discontinuities, means for supplying said liquid to upper portions of all of said walls, said first serpentine path having a smaller cross sectional area than said second serpentine path, means defining an enlarged chamber at the lower end of said second serpentine path, means defining a transverse passageway interconnecting the lower end of said first serpentine path with said enlarged chamber, the lower portions of said second and third walls having abrupt edges releasing the films of liquid to drop therefrom as a pair of free liquid curtains across said transverse passageway, and means forcing the gas down through said first serpentine path, through said transverse passageway past two free curtains into said chamber and then up said second serpentine path.

11. Gas washing apparatus for producing intimate contact between a liquid and a gas comprising first, second, third, and fourth spaced vertically undulating walls, means supporting said first and second walls in generally upright spaced relationship defining a first upright uniform serpentine path therebetween, means supporting said third and fourth walls in generally upright spaced relationship defining a second upright uniform serpentine path therebetween, the inner surfaces of all of said walls being smooth and continuous and free from abrupt discontinuities, means for supplying said liquid to upper portions of all of said walls and forming liquid curtains thereover, means defining a transverse path joining the lower portions of said first path with the lower portion of said second path, said first serpentine path having approximately one half the effective length of said second path and being of smaller uniform cross sectional area than said second path, and means forcing the gas down through said first serpentine path, through said transverse path and up said second serpentine path.

12. Air washing apparatus for use with paint spray booths comprising a first floodsheet having a planar portion extending substantially vertically with a convex portion tangent thereto and sweeping inwardly behind and below said planar portion, first liquid supply means supplying washing liquid to the top of the front face of said first floodsheet forming a first liquid curtain flowing downwardly thereover, the curvature of said convex portion being so gradual that a substantial portion of said first liquid curtain clings thereto, a second substantially planar floodsheet extending substantially vertically and being positioned below said first floodsheet in approximately coplanar relationship therewith, second liquid supply means supplying washing liquid to the top of the front face of said second floodsheet forming a second liquid curtain flowing downwardly thereover, the top of said second floodsheet being spaced below said convex portion and defining therewith an air intake opening, first, second, third, and fourth upright undulatingly curved walls, said first and second walls being in spaced relationship defining a first serpentine path therebetween communicating with said intake, and extending down from said intake, said third and fourth walls being in spaced relationship and defining a second serpentine path therebetween communicating at the bottom with said first serpentine path, the inner surfaces of all four of said walls being smooth and continuous and free from abrupt discontinuities, said second wall continuing down from said convex portion and having said first liquid curtain continue thereover, said second wall having an abrupt edge near its lower limit releasing said first curtain as a free falling curtain, the inner surfaces of said first, third and fourth walls having liquid curtains thereover, said third wall having an abrupt edge near its lower limit releasing its curtain as a free falling curtain, and means forcing the air in through said intake and down said first serpentine path, through said two free falling liquid curtains and up said second serpentine path.

References Cited in the file of this patent

UNITED STATES PATENTS

| 2,316,491 | Teichner | Apr. 13, 1943 |
| 2,337,983 | Fisher | Dec. 28, 1943 |
| 2,373,330 | Nutting | Apr. 10, 1945 |
| 2,527,139 | Loney | Oct. 24, 1950 |
| 2,719,705 | Watson | Oct. 4, 1955 |